United States Patent [19]
Abt et al.

[11] Patent Number: 5,207,089
[45] Date of Patent: May 4, 1993

[54] METHOD FOR MEASURING THE CONTROL CROSS SECTION AREA OF A NOZZLE

[75] Inventors: Jürgen Abt, Gerlingen; Sybille Stumpf, Markgröningen; Ulrich Kuhn, Renningen-Malmsheim; Werner Banzhaf, Sindelfingen, all of Fed. Rep. of Germany; Gerhard Felten, Summerville, S.C.; Gerold Lemperle, Leinfelden; Michael Specker, Blaichach, both of Fed. Rep. of Germany

[73] Assignee: Robert Bosch GmbH, Stuttgart, Fed. Rep. of Germany

[21] Appl. No.: 720,841

[22] PCT Filed: Nov. 23, 1989

[86] PCT No.: PCT/DE89/00733
§ 371 Date: Jul. 11, 1991
§ 102(e) Date: Jul. 11, 1991

[87] PCT Pub. No.: WO90/08299
PCT Pub. Date: Jul. 26, 1990

[30] Foreign Application Priority Data
Jan. 13, 1989 [DE] Fed. Rep. of Germany ....... 3900836

[51] Int. Cl.[5] ............................................. G01B 13/008
[52] U.S. Cl. ........................................ 73/37.5; 73/37.5

[58] Field of Search ................ 73/37.5, 37, 861.52, 73/861.61; 33/DIG. 2

[56] References Cited
U.S. PATENT DOCUMENTS

| | | | |
|---|---|---|---|
| 3,838,598 | 10/1974 | Tompkins | 73/861.52 |
| 4,161,119 | 7/1979 | Brandt, Jr. | 73/861.52 |
| 4,753,114 | 6/1988 | Jones, Jr. et al. | 73/861.61 |
| 5,961,349 | 10/1990 | Tanis | 73/861.52 |

OTHER PUBLICATIONS

"Flow-Its Measurement and Control in Science and Industry" vol. 1, Part 1, 1974, pp. 263-267.

*Primary Examiner*—Hezron E. Williams
*Assistant Examiner*—Nashmiya Ashraf
*Attorney, Agent, or Firm*—Michael J. Striker

[57] ABSTRACT

The method for measuring the cross-sectional area of a nozzle by a pneumatic through-flow method with supercritical pressure ratio measures the volume flow flowing through the nozzle on its input side by a differential pressure measurement at a resistance distance through which a laminar flow passes. Deviations of the temperature of the test medium from a reference value are determined by a temperature sensor and accounted for via a correction factor.

10 Claims, 1 Drawing Sheet

METHOD FOR MEASURING THE CONTROL CROSS SECTION AREA OF A NOZZLE

BACKGROUND OF THE INVENTION

The present invention relates to a method for measuring the control cross section area of a nozzle. The so-called Rota method, in which a flow passes through the nozzle in a supercritical ratio $P_A/P_E = 0.52$ (for air), was previously used for such measurements. In so doing, a floating-body flow meter is arranged in front of or in back of the test sample, depending on whether vacuum or overpressure method is utilized. Such a method has the disadvantage that it is relatively time consuming and not particularly accurate, requires a greater quantity of models for every nozzle type, and is difficult to automate. It is further known to measure the mass flow e.g. by means of a caloric flow meter. In this case, the pressure and temperature of the in-flowing medium (that is, on the high-pressure side of the test sample) is additionally measured and kept constant in a corresponding manner. Such a measuring method is relatively complicated and slow.

SUMMARY OF THE INVENTION

Accordingly, it is an object of the present invention to provide a method for measuring a control cross-section area of a nozzle, that enables very short measuring times and requires no pressure measurements.

In keeping with these objects and with others which will become apparent hereinafter, one feature of the present invention resides, briefly stated, in a method for measuring a control cross-sectional area of a nozzle by means of a pneumatic through-flow method with supercritical pressure ratio, in accordance with which the flow passing through the nozzle is measured as volume flow on its input side.

In accordance with another feature of the present invention the volume flow can be determined by means of differential pressure measurement at a resistance distance through which a laminar flow passes. The resistance distance can comprise one or more tubes which are connected parallel.

Still another feature of the present invention is that the vacuum method can be carried out by means of a vacuum pump. On the other hand, the overpressure method can be used in the inventive method for measuring the control cross-section area.

A further feature of the present invention is that deviations of the temperature of the test medium from a reference temperature are detected by means of a temperature sensor and taken into consideration in a correction factor.

Finally, the measurement variables of differential pressure, temperature and possibly additional auxiliary variables are determined and processed in a computer-controlled test device. This method makes use of the physical advantages of the supercritical through-flow and accordingly reduces the influence of errors. The quantity of measurement variables required for determining the sought for control cross section area is reduced to only one essential measurement variable, namely, that of the volume flow; the temperature is required only for a correction factor. Moreover, the method results in a linear characteristic line of measuring values, enables a large measuring range and is also easy to check.

The novel features which are considered as characteristic for the invention are set forth in particular in the appended claims. The invention itself, however, both as to its construction and its method of operations, together with additional objects and advantages thereof, will be best understood from the following description of specific embodiments when read in connection with the accompanying drawings.

DESCRIPTION OF THE PREFERRED EMBODIMENTS

Figure 1:
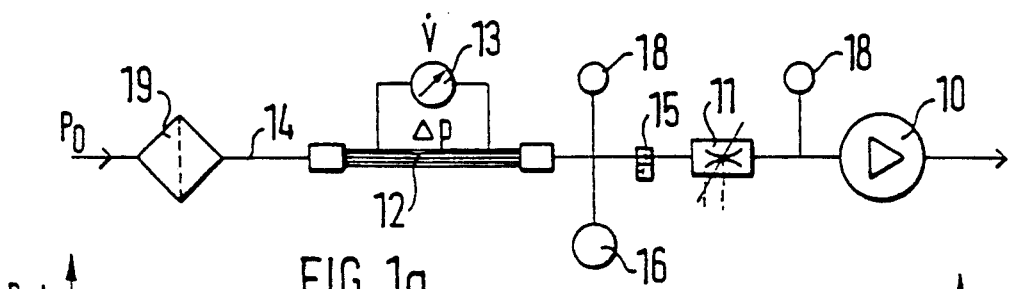
FIG. 1 is a view schematically showing a measuring device in accordance with the present invention.
Figure 1A:
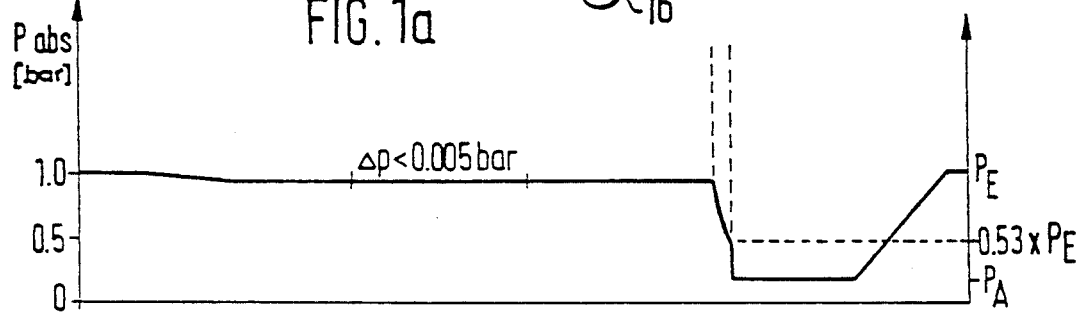
FIG. 1a is a pressure diagram of the measuring device of FIG. 1.

In the measuring device according to FIG. 1, in which the vacuum method is used, a vacuum pump is designated by 10, the test sample (nozzle) is designated by 11, and a laminar flow distance with a differential receiver 13, which serves to measure the volume flow, is designated by 12. The laminar flow distance 12 advisably comprises a plurality of tubes which are connected in parallel and are connected with the line 14 connected to the vacuum pump. The atmospheric air pressure $P_O$ prevails at the input side of the laminar flow distance 12, reduced by the pressure drop in the filter 19, pressure $P_E$ in front of the test sample 11, and pressure $P_A$ in back of the test sample. As can be seen from FIG. 1a, in which the absolute pressure $P_{ABS}$ is plotted in bar on the ordinate, the differential pressure at the laminar flow distance is very low, e.g. 0.005 bar.

Figure 2:
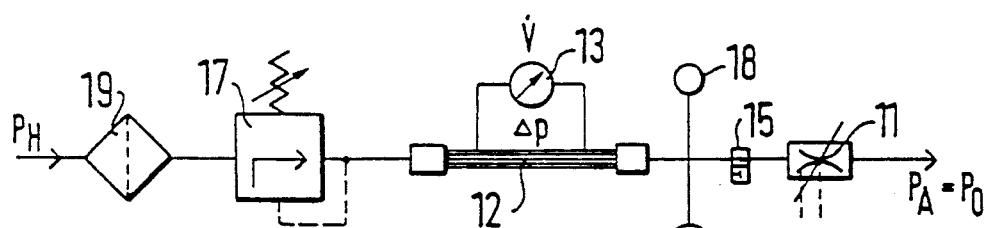
FIG. 2 is a view substantially corresponding to the view of FIG. 1 but showing a measuring device in accordance with another embodiment in accordance with the present invention.
Figure 2A:
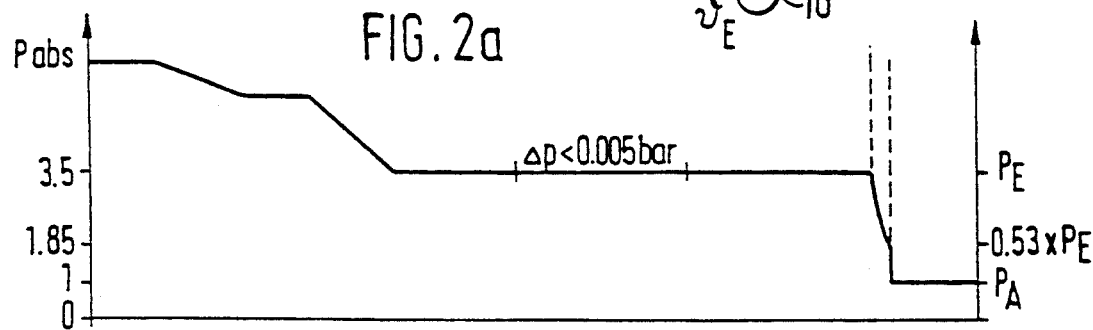
FIG. 2a is a pressure diagram of the measuring device of FIG. 2.

The measuring device according to FIG. 2 makes use of the overpressure method. It differs from the above method in that a pressure $P_H$ prevails in the line 14 in front of the laminar flow distance 12 and in front of a pressure regulator 17 arranged prior to the latter. The pressure $P_A = P_O$ (atmospheric air pressure) in back of the test sample 11.

A valve 15 and a temperature measuring device 16 can be arranged in front of the test sample. One or two manometers 18 can be arranged in front of and in back of the test sample according to FIGS. 1 and 2. The manometers 18 serve to adjust the operating pressures $P_A$ and $P_E$ (by means of a vacuum pump 10 or pressure regulator 17) in such a way that the minimum condition for the supercritical pressure ratio is safely maintained.

It can be seen from the above measuring device that the measurement variable of the volume flow is on the input side (high-pressure side) of the test sample. As is shown below, no pressure measurement is required which goes beyond the safety of the supercritical pressure ratio. As is also shown, errors of the test value due to deviations in the temperature of the test medium from a fixed reference value can be eliminated by means of a correction factor. A temperature correction is also required only when there are temperature deviations of more than 10 K. from the fixed reference value (e.g. 20° C.).

The following applies for the mass flow $\overset{.}{M}$ with supercritical through-flow through the test sample:

$$\dot{M} = \text{Konst}_G \cdot P_E \frac{1}{\sqrt{T_E}} A$$

Konst$_G$=material variable of the type of gas used (air)
A=cross-sectional area of the nozzle
P$_E$=input pressure
T$_E$=temperature (absolute) at the input side of the test sample.

The mass flow is thus proportional only to the input pressure and not—as in the subcritical flow—to the root of the pressure differential P$_E$−P$_A$. However, for various reasons, the mass flow is not the optimal measurement variable.

Taking into consideration the relationship of pressure, density and temperature of the test sample (ideal gas law), it follows that $$\rho_E = \rho_O \frac{T_O P_E}{P_O T_E}$$

wherein $\rho_E$, P$_E$, T$_E$ designate density, pressure, (absolute temperature) of the test medium in the variable operating state E (on the high-pressure side of the test sample) and $\rho_O$, P$_O$, T$_O$ designate density, pressure, (absolute) temperature of the test medium under standard conditions, that is, fixed constant variables.

The equation for the volume flow in operating state 1 (on the high-pressure side) at supercritical flow is $$\dot{V}_E = \dot{M}/\rho_E = K \cdot \sqrt{T_E} \cdot A$$

This equation states that the volume flow measured on the high-pressure side of the test sample at supercritical flow is no longer a function of pressure, i.e. depends neither on the input pressure nor on the output pressure. Accordingly, this volume flow is the most advisable measurement variable for determining the control cross section area A.

A relatively weak temperature dependency (over the root of the absolute temperature) remains as an influence of the operating parameter, so that e.g. a temperature deviation of the test medium air by 10 K. from the fixed reference value (e.g. 20° C.) leads to an error in the through-flow, and accordingly in the cross-sectional area A, of 1.7%. This error influence can be eliminated by means of an (additional) temperature sensor 16 which determines the temperature in the operating state E (in front of the test sample).

The sought for control cross section area A can accordingly be expressed in the following equation (after converting the above equation):

$$A = K \cdot \dot{V}_E (1 - 0.0017(\delta_E - 20° C.))$$

wherein

K' is a constant variable for the medium (air) and
$\delta_E$ is the temperature (in °Celsius) of the test medium in front of the test sample (nozzle).

The measurement of the volume flow $\dot{V}_E$ is effected according to the Hagen-Poiseuille law:

$$\dot{V}_E = K_L \cdot \frac{1}{\eta} \cdot \Delta p$$

wherein K$_L$ is the calibration factor of the measuring distance 12 through which the laminar flow passes ($\triangleq$resistance distance); $\eta$ is the dynamic viscosity of the test medium; $\Delta$P is the differential pressure tapped at measuring distance 12.

The differential pressure $\Delta$p is measured with a differential pressure receiver 13 with a short response time; such devices are commercially available.

The suggested method for measuring the volume flow makes use of the special fact that the dynamic viscosity in gases (in the test medium) is independent of the pressure, especially the operating pressure P$_E$ in the present case. However, a certain dependency on the temperature also remains in this case; approximately, the following equation applies for air as test medium:

$$\dot{V}_E = K'_L \cdot \Delta p \cdot (1 - 0.0025(\delta_E - 20° C.)) \quad \text{(II)}$$

In this case K'$_L$ is the calibrating factor of the measuring distance 12 for air at 20° C.; and $\delta_E$ is the temperature defined above.

Finally, the combination of the two equations I and II gives the following for the cross-sectional area:

$$A = K'' \cdot \Delta p \cdot (1 - 0.0042(\delta_E - 20° C.)) \quad \text{(III)}$$

The constant factor $K'' = K'_L \cdot K'$ contains the material variables of the test medium and the geometry factors of the laminar flow measurement distance.

The expression in parentheses is the temperature correction factor K$_T$. If the temperature of the test medium is precisely equal to the reference temperature (20° C.), then the correction factor K$_T$=1, and there is a very simple linear relationship between the sought for cross-sectional area A and the measured differential pressure at the laminar flow measuring distance $\Delta$p.

Note: If the temperature of the test medium at the input of the test sample $\delta_E$ does not match the temperature of the test medium at the laminar flow measuring distance $\delta_L$ (e.g. at a great spatial distance), a second temperature sensor is required (for $\delta_L$) and a modified temperature correction must be carried out:

$$K_T = (1 + 0.0017(\delta_E - 20° C.) - 0.0059(\delta_L - 20° C.))$$

The measurement variables $\Delta$p and $\delta_E$ ($\delta_L$) required for determining the test variable A can be determined and processed, according to equation III, in a computer-controlled testing device which contains the components shown in FIGS. 1 and 2, but is not itself shown in the drawing.

It will be understood that each of the elements described above, or two or more together, may also find a useful application in other types of constructions differing from the types described above.

While the invention has been illustrated and described as embodied in a method for measuring a control cross-section area of a nozzle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for measuring a control cross-section area of a nozzle, comprising the steps of providing a pneumatic through-flow of a medium through a nozzle with supercritical pressure ratio of pressures in back and in front of the nozzle; measuring the flow passing through the nozzle as a volume flow ($V_E$) on an input side of the nozzle; and determining a control cross-section area of the nozzle as follows:

$$A = K' \cdot V_E (1 - 0.0017(\delta_E - 20° C.))$$

wherein $K'$ is a constant variable for the medium and $\delta_E$ is the temperature (in °Celsius) of the test medium in front of the nozzle.

2. A method as defined in claim 1, wherein said measuring the flow includes determining the volume flow by a differential pressure measurement at a resistance distance through which the flow passes in a laminar fashion on the input side of a nozzle.

3. A method as defined in claim 2, wherein said resistance distance includes at least one tube.

4. A method as defined in claim 2, wherein said resistance distance includes a plurality of tubes connected in parallel.

5. A method as defined in claim 1; and further comprising applying a vacuum to provide the pneumatic through flow of the medium.

6. A method as defined in claim 5, wherein said vacuum is applied by means of a vacuum pump.

7. A method as defined in claim 1; and further comprising the step of applying an overpressure to provide said pneumatic through-flow of the medium.

8. A method as defined in claim 1; and further comprising the step of detecting deviations of a temperature of the medium from a reference temperature, and taking the deviations into consideration as a correction factor.

9. A method as defined in claim 8, wherein said detecting of the variations is performed by means of temperature sensor.

10. A method as defined in claim 1; and further comprising determining the volume flow by a differential pressure measurement at a resistance distance through which a laminar flow passes to the nozzle; detecting deviations of a temperature of a medium from a reference temperature and taking it into consideration as a correction factor; determining measurement variables of the pressure and the temperature; and processing the measurement variables in a computer-controlled test device.

* * * * *